US010203537B2

(12) United States Patent
Sato

(10) Patent No.: US 10,203,537 B2
(45) Date of Patent: Feb. 12, 2019

(54) ELECTRONIC COMPONENT AND ELECTRONIC DEVICE USING THE SAME

(71) Applicant: Japan Display Inc., Minato-ku (JP)

(72) Inventor: Yuji Sato, Minato-ku (JP)

(73) Assignee: Japan Display Inc., Minato-ku (JP)

(\*) Notice: Subject to any disclaimer, the term of this patent is extended or adjusted under 35 U.S.C. 154(b) by 312 days.

(21) Appl. No.: 14/273,714

(22) Filed: May 9, 2014

(65) Prior Publication Data
US 2014/0340597 A1 Nov. 20, 2014

(30) Foreign Application Priority Data
May 14, 2013 (JP) .................................. 2013-102545

(51) Int. Cl.
*G02F 1/1345* (2006.01)
*G02F 1/1333* (2006.01)
*G06F 3/044* (2006.01)

(52) U.S. Cl.
CPC .......... *G02F 1/13338* (2013.01); *G06F 3/044* (2013.01); *G02F 1/1345* (2013.01); *G02F 1/13452* (2013.01); *G02F 1/13458* (2013.01); *G02F 2001/13456* (2013.01); *G06F 2203/04103* (2013.01); *G06F 2203/04111* (2013.01)

(58) Field of Classification Search
CPC ................................................ G02F 1/13458
See application file for complete search history.

(56) References Cited

U.S. PATENT DOCUMENTS

| 9,182,844 B2* | 11/2015 | Misaki | G06F 3/0412 |
| 2002/0054261 A1* | 5/2002 | Sekiguchi | G02F 1/13338 349/122 |
| 2004/0233367 A1* | 11/2004 | Kim | G02F 1/133707 349/139 |

(Continued)

FOREIGN PATENT DOCUMENTS

| JP | 2002-49049 A | 2/2002 |
| JP | 2004-61687 A | 2/2004 |

(Continued)

OTHER PUBLICATIONS

Korean Office Action dated Aug. 12, 2015 in Patent Application No. 10-2014-0057143 (with English Translation).

(Continued)

*Primary Examiner* — Jessica M Merlin
*Assistant Examiner* — Mark D Teets
(74) *Attorney, Agent, or Firm* — Oblon, McClelland, Maier & Neustadt, L.L.P.

(57) ABSTRACT

An electronic component is equipped with a pad. The pad includes a lower transparent electric conductive layer formed on an insulating substrate. An insulating layer is formed on the lower transparent electric conductive layer. A contact hole is formed in the insulating layer for exposing the lower layer transparent electric conductive layer. A metal layer is formed on the lower transparent electric conductive layer and covered with the insulating layer so as to surround the contact hole. An upper transparent electric conductive layer is formed on the insulating layer and connected with the lower transparent electric conductive layer through the contact hole.

24 Claims, 10 Drawing Sheets

(56) References Cited

U.S. PATENT DOCUMENTS

| | | | | |
|---|---|---|---|---|
| 2014/0320761 A1* | 10/2014 | Misaki | .................... | G06F 3/044 349/12 |
| 2014/0340593 A1* | 11/2014 | Sato | .................... | G02F 1/13338 349/12 |
| 2014/0375909 A1* | 12/2014 | Misaki | .................... | G06F 3/044 349/12 |
| 2015/0042903 A1* | 2/2015 | Misaki | .................... | G06F 3/044 349/12 |

FOREIGN PATENT DOCUMENTS

| | | |
|---|---|---|
| JP | 2007-304512 | 11/2007 |
| JP | 2009-25803 A | 2/2009 |
| JP | 2011-100011 A | 5/2011 |
| JP | 2013-33549 A | 2/2013 |
| JP | 5717880 B2 | 3/2015 |
| KR | 2001-0066244 A | 7/2001 |
| KR | 10-2004-0000580 A | 1/2004 |
| TW | 201331800 A1 | 8/2013 |

OTHER PUBLICATIONS

Combined Taiwanese Office Action dated Jul. 24, 2015 in Patent Application No. 103116630 (with English Translation ).

Office Action dated May 31, 2016 in Japanese Patent Application No. 2013-102545 (with English language translation).

* cited by examiner

ELECTRONIC COMPONENT AND ELECTRONIC DEVICE USING THE SAME

CROSS-REFERENCE TO RELATED APPLICATION

This application is based upon and claims the benefit of priority from prior Japanese Patent Application No. 2013-102545, filed May 14, 2013, the entire contents of which are incorporated herein by reference.

FIELD

Embodiments described herein relate generally to an electronic component, a touch panel and a liquid crystal display device using the same.

BACKGROUND

Needs of a touch panel as an input interface in mobile terminals, such as a mobile phone, have been expanding by optical feature that haze is small and transmissivity is high, and wide application such as multi-touch correspondence. There is a capacitive sensor as one of position detection methods of the touch panel.

The touch panel using the electric capacitive sensor, for example, is attached to a display surface of a liquid crystal display panel. The touch panel is equipped with a glass substrate, a detection electrode formed of ITO (Indium Tin Oxide) and a pad on the glass substrate. The glass substrate of the touch panel is attached on the display surface of the liquid crystal display panel by adhesives. A detection electrode side of the touch panel is covered with a decorative plate. The decorative plate is attached on the touch panel by adhesives.

In the touch panel, when operator's fingers, etc., contact on the surface of the decorative plate to input data, the electrostatic capacitance of the detection electrode changes near the input position. For this reason, the detection electrode can detect the input data by detecting the change of electrostatic capacitance as voltage change. The inputted information is transmitted to the pad.

The above-mentioned pad is formed with electric conductive composite layers. However, ohmic contact may not be formed between the electric conductive layers.

BRIEF DESCRIPTION OF THE DRAWINGS

The accompanying drawings, which are incorporated in and constitute a portion of the specification, illustrate embodiments of the invention, and together with the general description given above and the detailed description of the embodiments given below, serve to explain the principles of the invention.

DETAILED DESCRIPTION

Figure 1:
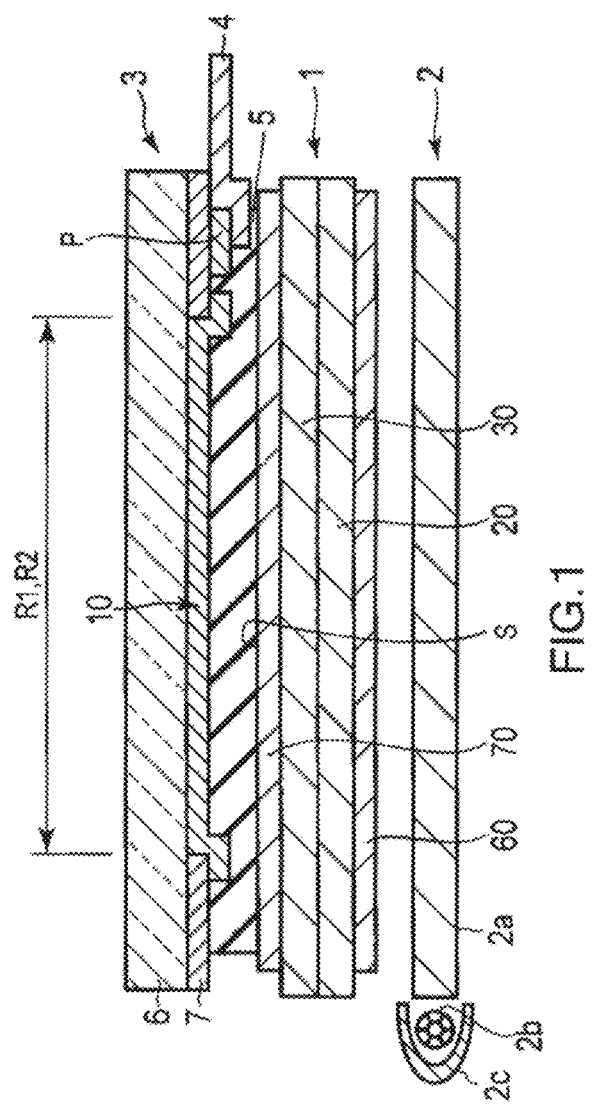
FIG. 1 is a cross-sectional view schematically showing a liquid crystal display device according to one embodiment.

An electronic component, a touch panel and a liquid crystal display device using the same according to an exemplary embodiment of the present invention will now be described with reference to the accompanying drawings wherein the same or like reference numerals designate the same or corresponding portions throughout the several views.

According to one embodiment, an electronic component equipped with a pad includes: a lower transparent electric conductive layer formed on an insulating substrate; an insulating layer formed on the lower transparent electric conductive layer; a contact hole formed in the insulating layer for exposing the lower transparent electric conductive layer; a metal layer formed on the lower transparent electric conductive layer and covered with the insulating layer so as to surround the contact hole; and an upper transparent electric conductive layer formed on the insulating layer and connected with the lower transparent electric conductive layer through the contact hole.

According to other embodiment, a touch panel includes: an insulating substrate including an input area and a peripheral area located adjacent to the input area; an input device arranged in the input area and including a plurality of detection electrodes arranged in first and second directions orthogonally crossing each other in a matrix shape; a plurality of pads arranged in the peripheral area and connected with the detection electrodes through connection wirings, wherein the pad including, a lower transparent electric conductive layer formed on the insulating substrate, an insulating layer formed on the lower transparent electric conductive layer, a contact hole formed in the insulating layer for exposing the lower transparent electric conductive layer, a metal layer formed on the lower transparent electric conductive layer and covered with the insulating layer so as to surround the contact hole, and an upper transparent electric conductive layer formed on the insulating layer and connected with the lower transparent electric conductive layer through the contact hole.

According to other embodiment, a liquid crystal display device includes: a touch panel including; an insulating substrate including an input area and a peripheral area located adjacent to the input area, an input device arranged in the input area and including a plurality of detection electrodes arranged in first and second directions orthogonally crossing each other in a matrix shape, a plurality of pads arranged in the peripheral area and connected with the detection electrodes through connection wirings, wherein the pad including, a lower transparent electric conductive layer formed on the insulating substrate, an insulating layer formed on the lower transparent electric conductive layer, a contact hole formed in the insulating layer for exposing the lower transparent electric conductive layer, a metal layer formed on the lower transparent electric conductive layer and covered with the insulating layer so as to surround the contact hole, and an upper transparent electric conductive layer formed on the insulating layer and connected with the lower transparent electric conductive layer through the contact hole, a liquid crystal display panel including a display area arranged facing the input area, wherein the insulating substrate includes a light shield layer in the peripheral region, and the pads are formed on the light shield layer.

Hereinafter, the electronic component, the touch panel equipped with the electronic component, and a liquid crystal display device equipped with the touch panel according to one embodiment are explained in detail, referring to drawings.

As shown in FIG. 1, the liquid crystal display device is equipped with a liquid crystal display panel 1 as a display panel having a display surface which displays images, a back light unit 2, a touch panel 3, a FPC (flexible printed circuits) 4 as a wiring substrate, and adhesive materials 5. In addition, the touch panel 3 is equipped with function as a decorative plate and a touch panel, to be mentioned later.

Figure 2:
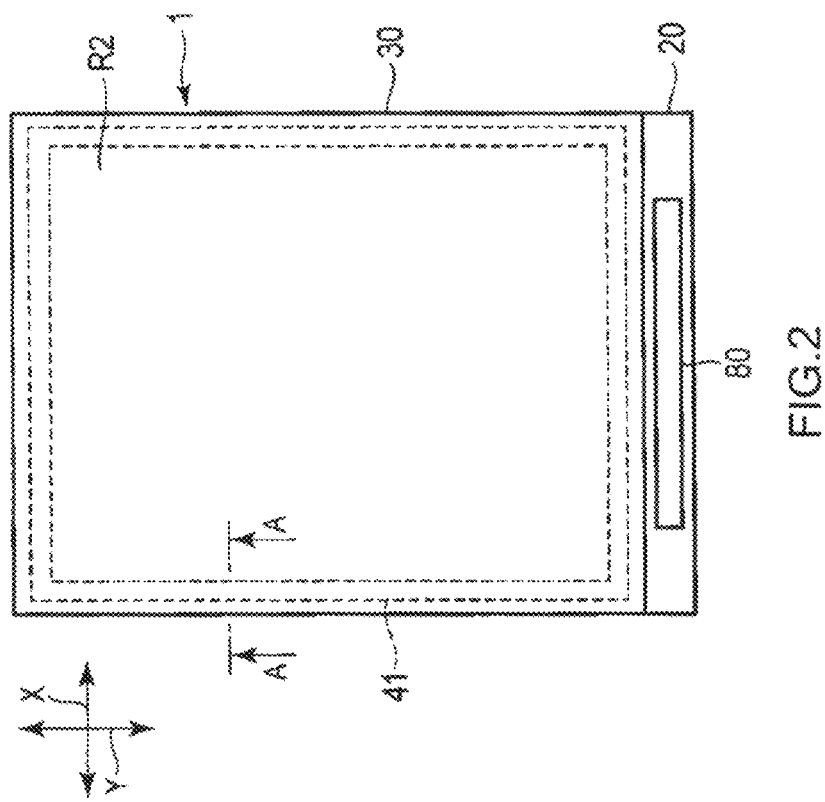
FIG. 2 is a plan view schematically showing the liquid crystal display panel shown in FIG. 1.
Figure 3:
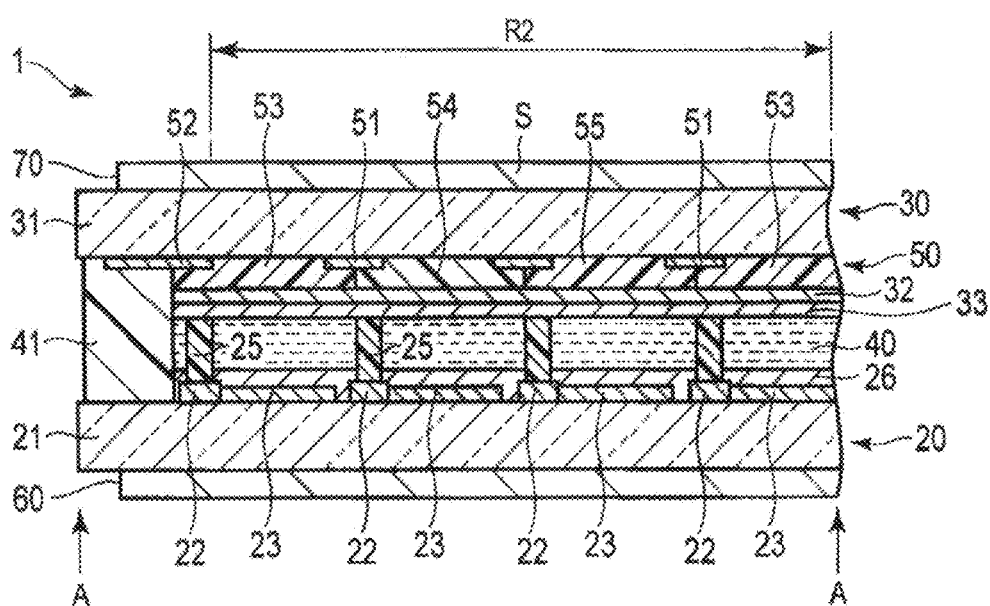
FIG. 3 is a cross-sectional view schematically showing a structure of the liquid crystal display panel taken along line A-A shown in FIG. 2.

As shown in FIGS. 1, 2 and 3, the liquid crystal display panel 1 is equipped with an array substrate 20, a counter substrate 30, a liquid crystal layer 40, a first polarization portion 60, and a second polarization portion 70 with a display surface S. The array substrate 20 and the counter substrate 30 are formed in a rectangular shape, respectively. The array substrate 20 is formed in a larger size than the counter substrate 30.

The array substrate 20 and the counter substrate 30 are arranged so that three sides of the substrates may almost overlap, respectively. In one remaining side of the array substrate 20, the array substrate 20 extends to outside of the counter substrate 30. In more detail, the array substrate 20 and the counter substrate 30 are arranged so that they may almost overlap in the first direction X. In a second direction Y orthogonally crossing the first direction X, the array substrate 20 extends to outside of the counter substrate 30. The liquid crystal display panel 1 includes a display area R2 in a rectangular shape which overlaps with the array substrate 20 and the counter substrate 30.

The array substrate 20 includes a rectangular glass substrate 21 as a transparent insulating substrate. A driving circuit 80 is mounted on the glass substrate 21 on a portion away from the counter substrate 30. In the display area R2, a plurality of pixels is arranged on the glass substrate 21. The pixels are arranged in the shape of a matrix along with the first direction X and the second direction Y. In the display area R2, a plurality of signal lines and scanning lines which are not illustrated are formed in the shape of a lattice on the glass substrate 21.

In the circumference of an intersection portion of the signal line with the scanning line, TFT (Thin Film Transistor) 22 is provided as a switching element, for example. On the glass substrate 21, a plurality of pixel electrodes 23 are formed in the shape of a matrix. The pixel electrode 23 is formed of transparent electric conductive materials, such as ITO (Indium Tin Oxide). The pixel includes TFT22 and the pixel electrode 23 electrically connected with the TFT, respectively.

On the glass substrate 21 in which TFT22 and the pixel electrode 23 are formed, a plurality of pillar-shaped spacers 25 are formed. An alignment film 26 is formed on the glass substrate 21 and the pixel electrode 23.

The counter substrate 30 includes a rectangular glass substrate 31 as a transparent insulating substrate. In the display area R2, a color filter 50 is formed on the glass substrate 31. The color filter 50 has a shielding portion 51, a circumference shielding portion 52, and a plurality of colored layers such as a red colored layer 53, a green colored layer 54, and a blue colored layer 55.

The shielding portion 51 is formed in the shape of a lattice so as to overlap with the signal line and the scanning line. The circumference shielding portion 52 is formed in the shape of a rectangular frame in all over the circumference of the display area R2. The circumference shielding portion 52 contributes to shield the light which leaks to the outside of the display region R2.

The colored layers 53, 54, and 55 are formed on the glass substrate 31, the shielding portion 51, and the circumference shielding portion 52. The colored layers 53, 54, and 55 adjoin in the first direction X mutually, and are arranged alternately. The colored layers 53, 54, and 55 are formed in the shape of a stripe, respectively extending in the second direction Y, and overlap with the pixel located in a line in the second direction Y. The peripheral portions of the colored layers 53, 54, and 55 overlap with the shielding portion 51 and the circumference shielding portion 52. On the color filter 50, a counter electrode 32 is formed of transparent electric conductive materials, such as ITO. An alignment film 33 is formed on the counter electrode 32.

The array substrate 20 and the counter substrate 30 are arranged with a predetermined gap therebetween by a pillar-shaped spacer 25 so as to counter each other. The array substrate 20 and the counter substrate 30 are attached each other by a seal material 41 provided in the peripheral portions of both substrates, which are outside of the display area R2. The liquid crystal layer 40 is held between the array substrate 20 and the counter substrate 30, and surrounded by the seal material 41.

The first polarization portion 60 is arranged on the external surface of the glass substrate 21. The second polarization portion 70 is arranged on the external surface of the glass substrate 31. As mentioned above, the display surface S is formed in the external surface of the second polarization portion 70.

As shown in FIG. 1, a back light unit 2 is arranged on the external surface side of the array substrate 20. The back light unit 2 includes a light guide plate 2a arranged so as to face the first polarization portion 60, and a light source 2b and a light reflector 2c arranged so as to face an end side of the light guide plate 2a.

Figure 4:
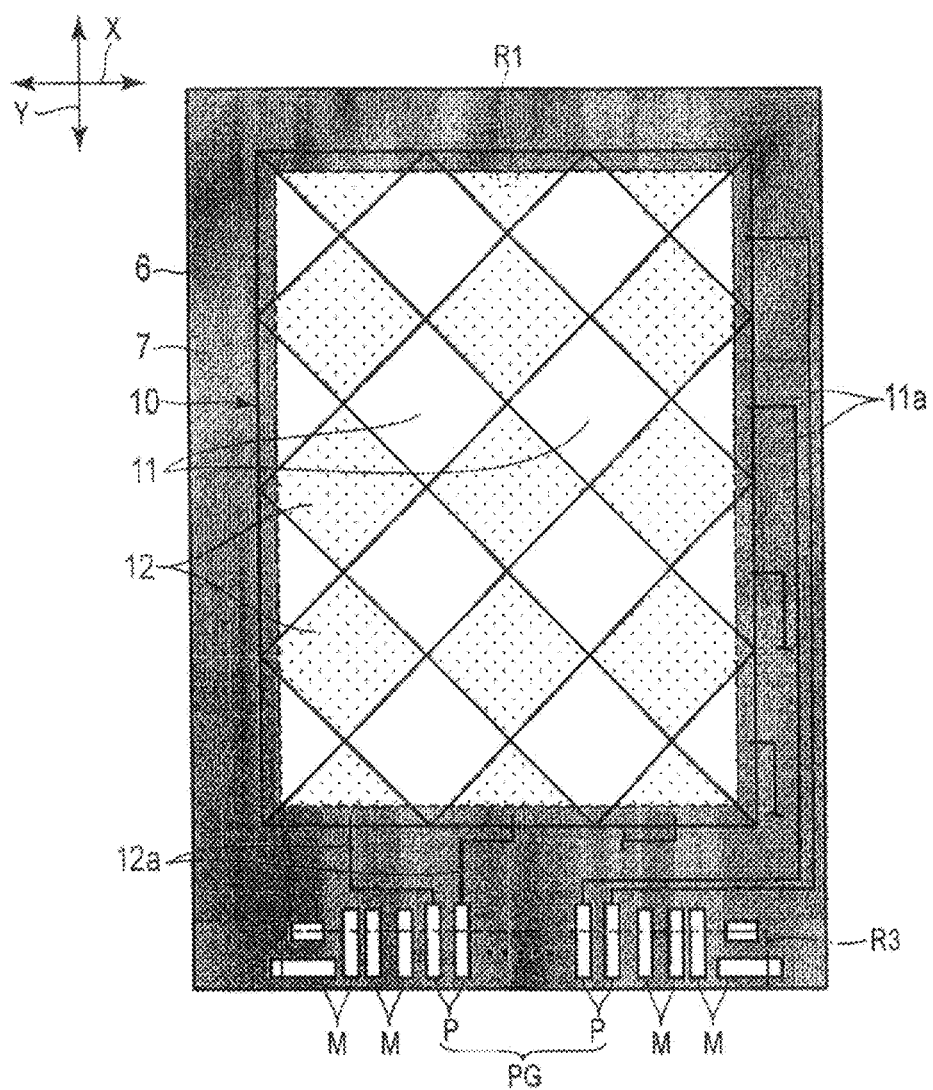
FIG. 4 is a plan view schematically showing a touch panel shown in FIG. 1.
Figure 5:
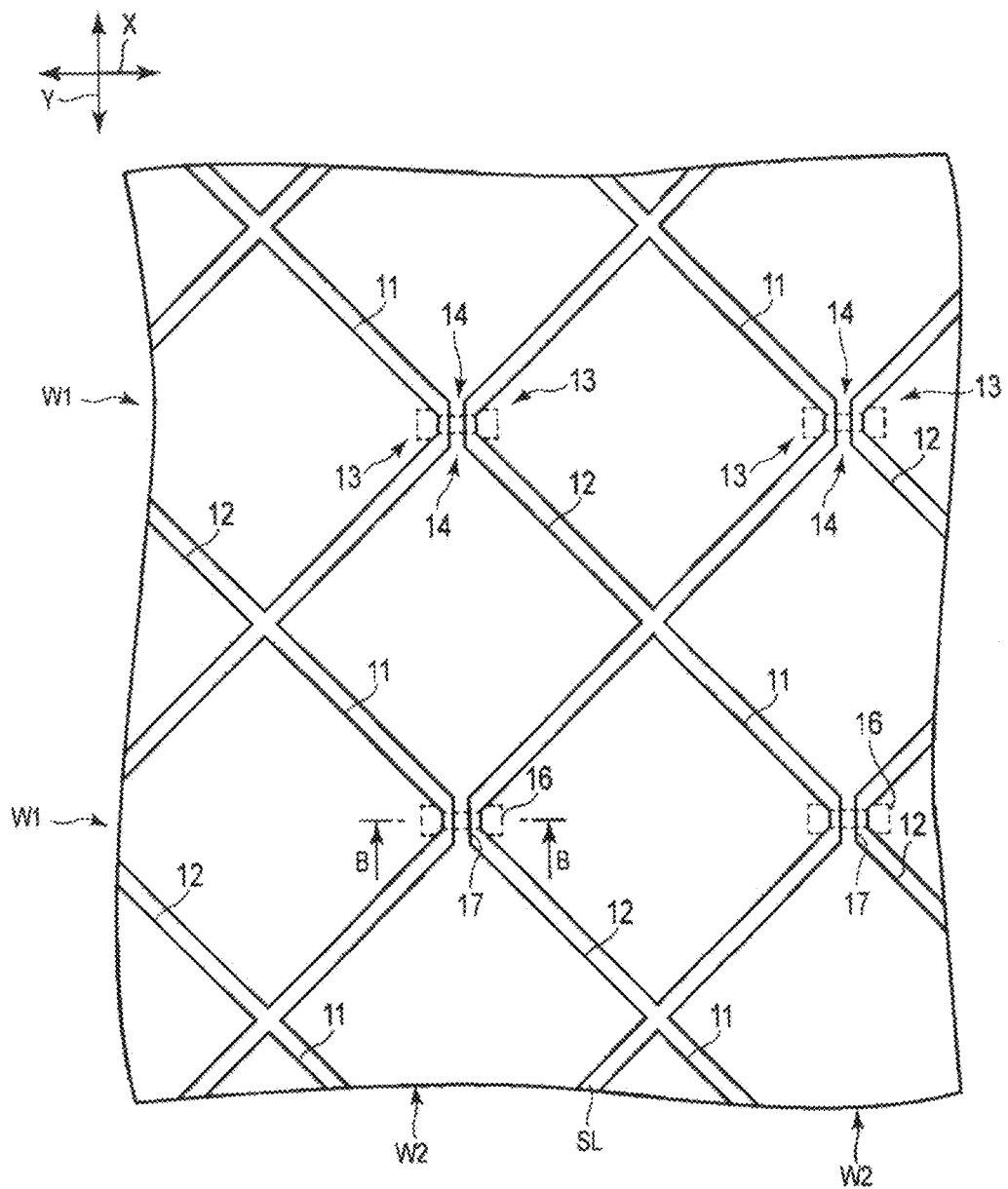
FIG. 5 is a partially enlarged plan view showing the touch panel, specifically a sensor module.
Figure 6:
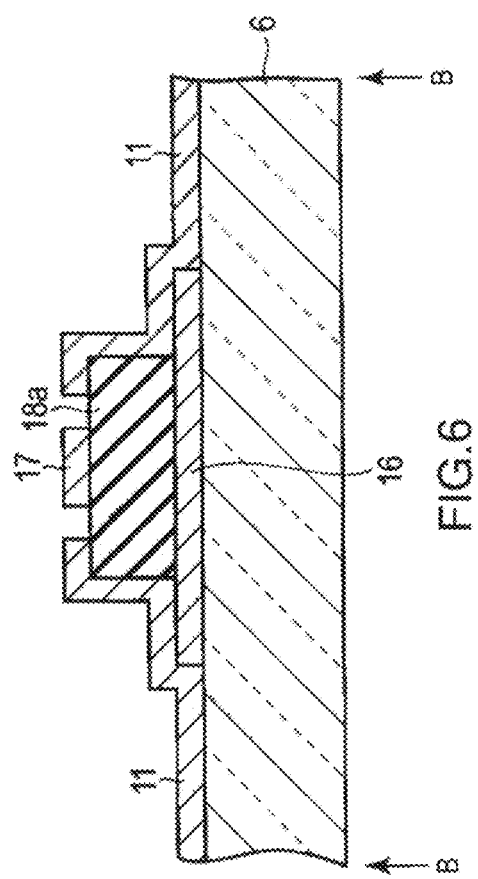
FIG. 6 is a cross-sectional view showing a portion of the sensor module taken along line B-B in FIG. 5.
Figure 7:
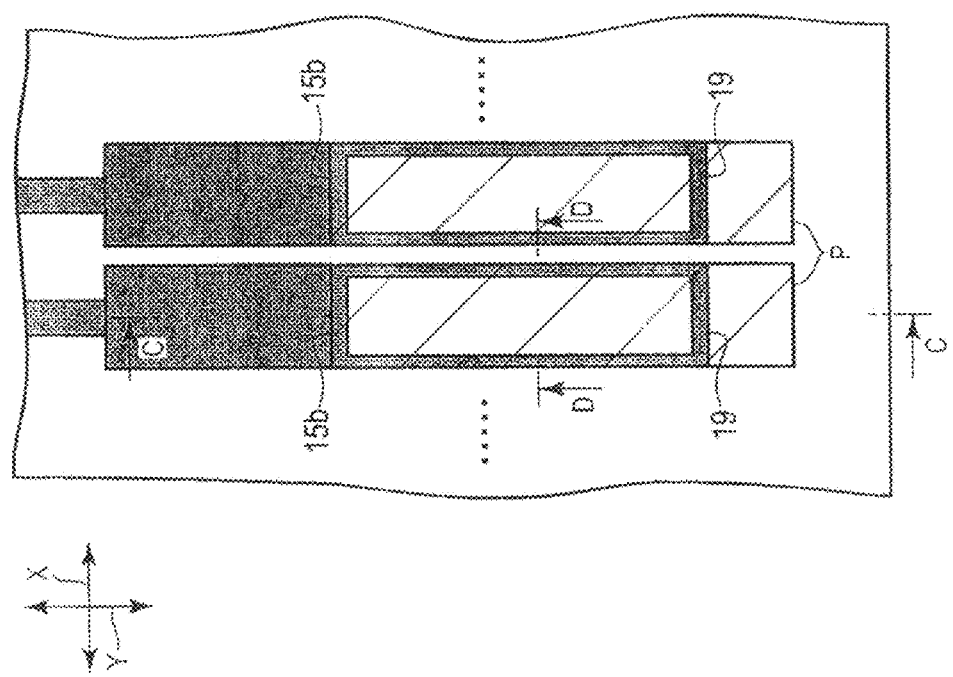
FIG. 7 is a partially enlarged plan view showing the touch panel.

As shown in FIG. 1 and FIG. 4, the touch panel 3 is equipped with a transparent insulating substrate 6, a shielding layer 7 as a shielding portion, a sensor module 10, a pad group PG, and an alignment pattern M. The touch panel 3 includes an input area R1. Herein, the input area R1 overlaps with the display area R2.

The insulating substrate 6 faces the display surface S of the liquid crystal display panel 1. The insulating substrate 6 is formed in the shape of a rectangle having a flat surface. The insulating substrate 6 ornaments the display surface S side of the liquid crystal display panel 1, and decorates appearance of the liquid crystal display device. For this reason, the insulating substrate 6 is formed with a glass substrate and functions as a decorative plate.

The insulating substrate 6 may be formed of transparent insulating material, such as an acrylic resin without being limited to the glass substrate. For example, when forming the insulating substrate 6 using the acrylic resin, weight saving and cost reduction can be attained compared with the case in which the glass substrate is used. Moreover, the insulating substrate 6 protects the sensor module 10 mechanically by preventing breakage of the sensor module 10, and also the sensor module 10 chemically by preventing invasion of humidity to the sensor module 10.

Figure 8:
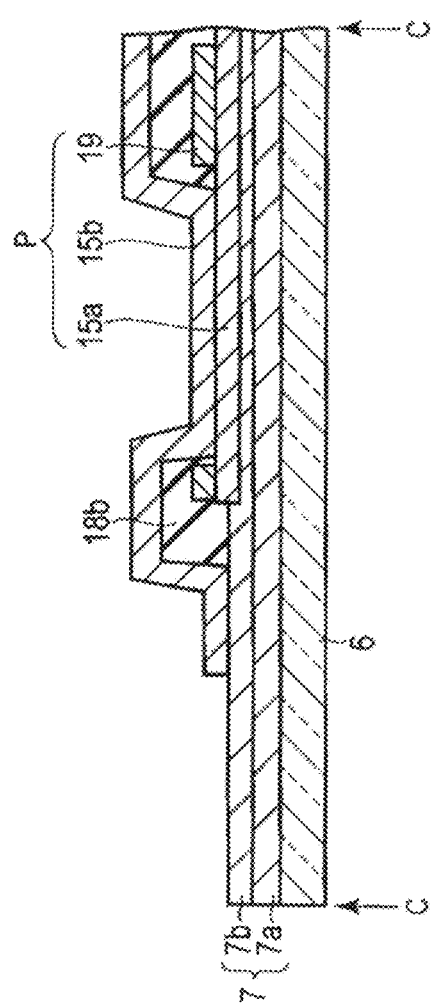
FIG. 8 is a cross-sectional view showing the touch panel, specifically the pad taken along line C-C in FIG. 7.
Figure 9:
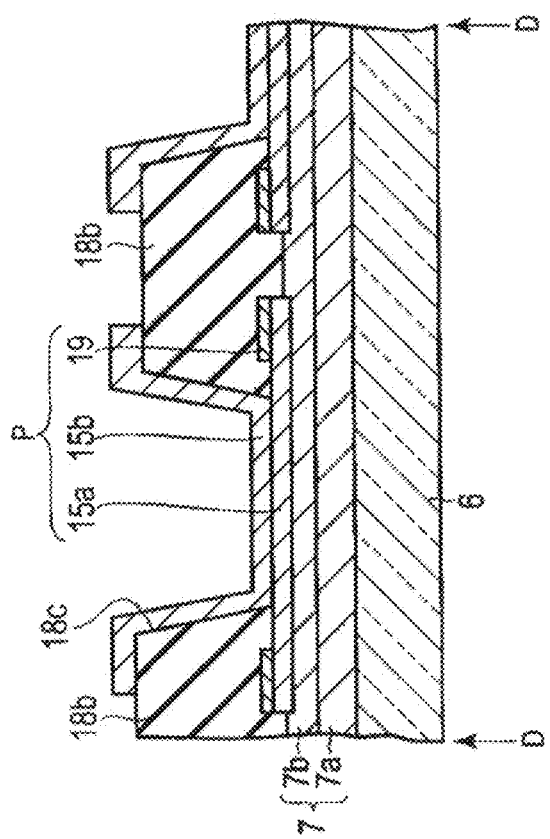
FIG. 9 is a cross-sectional view showing a portion of the touch panel, specifically the pad taken along line D-D in FIG. 7.

The shielding layer 7 is formed by laminating a first shielding layer 7a and a second shielding layer 7b (FIG. 8 and FIG. 9). The shielding layer 7 is formed in the shape of a rectangular frame on the back of the insulating substrate 6, and surrounds the input area R1. The shielding layer 7 is formed in a black frame and contributes to shield the leaked light from the input area R1 to outside.

As shown in FIGS. 1, 4, 5, and 6, the sensor module 10 is formed on the back of the insulating substrate 6 in which the shielding layer 7 is formed, and faces the display surface S of the liquid crystal display panel 1. The sensor module 10 uses a capacitive sensor as a position detection method. The sensor module 10 detects input informations (input position coordinate information) by input means from the surface side of the insulating substrate 6.

The sensor module 10 includes a plurality of first detection electrodes 11 and second detection electrodes 12 as the detection electrode by which electrostatic capacitance changes with the inputs (contact to the surface of the insulating substrate 6) by input means, such as an operator's finger and a conductor. The electrode pattern of the sensor module 10 includes a plurality of connection wirings 16 and 17 besides the plurality of first detection electrodes 11 and second detection electrodes 12.

The first detection electrode 11, the second detection electrode 12, the connection wiring 16, and the connection wiring 17 are arranged on the back of the insulating substrate 6 in the input area R1, and formed, for example, of ITO (Indium Tin Oxide) as a transparent electric conductive material. Herein, the connection wiring 16 is formed by a first manufacturing process using ITO. On the other hand, the first detection electrode 11, the second detection electrode 12, and the connection wiring 17 are formed by a second manufacturing process using ITO.

The plurality of first detection electrodes 11 is arranged in the first direction X and the second direction Y. The first detection electrode 11 is formed in a square shape with a diagonal line in the first direction X and the second direction Y, respectively. The first detection electrode 11 includes a first angle portion which counters each other along the first direction X. The adjacent first angle portions in the first direction X are connected.

In this embodiment, the first angle portion of the first rectangular detection electrode 11 is crushed and forms a first narrow side 13. For this reason, the first detection electrode 11 is formed in a hexagon shape with the first narrow end 13. Moreover, the adjacent first narrow ends 13 are connected through a connection wiring 16. The connection wiring 16 is formed in the shape of an island on the insulating substrate 6.

The plurality of first detection electrodes 11 and connection wirings 16 connected mutually form a first wiring W1 that extends in the first direction X. The plurality of first wirings W1 is arranged in the second direction Y. As mentioned above, the plurality of the first detection electrodes 11 and connection wirings 16 are formed by different manufacturing processes each other. By detecting change of electrostatic capacitance using the first wiring W1, X coordinates of the input position are detectable by input means.

The plurality of second detection electrodes 12 is arranged in the first direction X and the second direction Y with a space between the second detection electrodes 12 and the first detection electrodes 11. The second detection electrode 12 is formed in a square shape with a diagonal line in the first direction X and the second direction Y, respectively. The adjacent second detection electrodes 12 include second angle portions which counter each other along the second direction Y. The adjacent second angle portions are connected in the second direction Y.

In this embodiment, the second angle portion of the second rectangular detection electrode 12 is crushed, and includes a second narrow end 14. For this reason, the second detection electrode 12 is formed in a hexagon shape with the second narrow end 14. Moreover, adjacent second short ends 14 are connected through a connection wiring 17. The connection wiring 17 is arranged in the shape of an island on the insulating substrate 6.

The plurality of second detection electrodes 12 and connection wirings 17 connected mutually form a second wiring W2 that extends in the second direction Y. The plurality of second wirings W2 is arranged in the first direction X. The plurality of second detection electrodes 12 and connection wirings 17 in the second wiring W2 are simultaneously formed by the same manufacturing process. By detecting change of electrostatic capacitance using the second wiring W2, Y coordinates of the input position are detectable by the input means.

A slit SL in a lattice shape is formed between the first detection electrode 11 and the second detection electrode 12. Thereby, electric insulation distance is secured between the first detection electrode 11 and the second detection electrode 12. On the insulating substrate 6, a plurality of insulating layers 18a is arranged in the shape of an island. The plurality of insulating layers 18a is arranged at a plurality of intersection portions in which the plurality of first wirings W1 and second wiring W2 cross on the insulating substrate 6 so as to interpose the insulating layer 18a therebetween. The insulating layer 18a prevents short circuit between the first wiring W1 and the second wiring W2. In this embodiment, the insulating layer 18a is formed of an organic insulating material.

The connection wiring 16 faces the connection wiring 17 interposing the insulating layer 18a therebetween. Herein, the connection wiring 16 is located under the insulating layer 18a, and the connection wiring 17 is located above the insulating layer 18a. Therefore, the connection wiring 17 can be said to be a bridge wiring.

In the outside of the input area R1, a plurality of wirings 11a and 12a are arranged on the insulating substrate 6 (shielding layer 7). One end portion of respective wirings 11a is connected to the first wiring W1 (the first detection electrode 11) located in the outside of the input area R1, and the other end portion is connected to the pad "p" of a pad group PG. One end portion of the respective wirings 12a is connected to the second wiring W2 (the second detection electrode 12) located in the outside of the input area R1, and the other end portion is connected to the pad "p" of the pad group PG. For this reason, the information on the X coordinates and the Y coordinates of the input position, which the sensor module 10 detects by the input means, is outputted to the plurality of pads "p" through the plurality of wirings 11a and 12a.

As shown in FIGS. 1, 4, and FIGS. 7, 8, 9, the pad group PG is arranged in an overlap area R3 located in the outside of the input area R1. The overlap area R3 is an area in which a connection area of the FPC 4 is attached to the insulating substrate 6. The overlap area R3 is provided in one side of the insulating substrate 6. The pad group PG is equivalent to an outer lead bonding pad group. The pad group PG is formed on the shielding layer 7.

The plurality of pads "p" of the pad group PG extends in the second direction Y, and is arranged in the first direction X mutually keeping an interval between the adjacent pads. Herein, the plurality of pads "p" is arranged at equal interval in the first direction X. The pad "p" is formed on the second shielding layer 7b. The pad "p" is formed with a metal pattern, a transparent electric conductive pattern, or their composite layers. In this embodiment, the pad "p" is formed with the composite layer of the metal pattern and the transparent electric conductive pattern.

In detail, the pad "p" includes a lower transparent electric conductive layer 15a as a transparent electric conductive pattern, a metal layer 19 as a metal pattern, an insulating layer 18b, and an upper transparent electric conductive layer 15b as a transparent electric conductive pattern.

The lower transparent electric conductive layer 15a is formed on the second shielding layer 7b. The lower transparent electric conductive layer 15a is formed in the shape of a rectangle. The lower transparent electric conductive layer 15a can be formed using ITO, etc. In this embodiment, since the connection wiring 16 is formed using ITO, the lower transparent electric conductive layer 15a can be formed simultaneously with the connection wiring 16 using ITO.

Moreover, the lower transparent electric conductive layer 15a can be used as a seat layer for the metal layer 19. Accordingly, adhesion nature of the metal layer 19 can be raised. In addition, the adhesion strength of the metal layer 19 to the lower transparent electric conductive layer 15a is stronger than the adhesion strength of the metal layer 19 to the second shielding layer 7b (shielding layer 7).

The metal layer 19 is formed on the lower transparent electric conductive layer 15a, and connected to the lower transparent electric conductive layer 15a. The metal layer 19 is formed in a rectangular frame shape. The metal layer 19 includes an aluminum layer formed with the material containing aluminum and a bottom barrier metal layer interposed between the aluminum layer and the lower transparent electric conductive layer 15a. The metal layer 19 is formed of two-layer structure.

The aluminum layer may be formed of aluminum or aluminum system alloy metal, such as AL-Nd (aluminum neodymium system alloy). The bottom barrier metal layer may be formed using Mo (molybdenum), a metal of chromium group elements other than Mo, and Ti (titanium). In this embodiment, the metal layer 19 is formed simultaneously with the wirings 11a and 12a. For this reason, the wirings 11a and 12a are also formed by the metal layer of the two-layer structure of the aluminum layer and the bottom barrier metal layer.

As mentioned above, the metal layer 19 includes the barrier metal layer (bottom barrier metal layer) only on the side which contacts the lower transparent electric conductive layer 15a. Thereby, compared with the case where MAM is used for formation of the metal layer 19, a manufacturing cost can be reduced, for example.

The insulating layer 18b is formed on the insulating substrate 6 in which the shielding layer 7, the lower transparent electric conductive layer 15a, and the metal layer 19 are formed. The insulating layer 18b includes a contact hole 18c facing the lower transparent electric conductive layer 15a, and exposing the lower transparent electric conductive layer 15a. The contact hole 18c is surrounded by the metal layer 19. For this reason, the metal layer 19 is completely covered with the insulating layer 18b. The lower transparent electric conductive layer 15a is covered with the insulating layer 18b except for the region which faces the contact hole 18c. The insulating layer 18b may be formed by an organic insulating material. In this embodiment, the insulating layer 18b is formed simultaneously with the insulating layers 18a using the organic insulating material.

The upper transparent electric conductive layer 15b is formed on the insulating layer 18b. The upper transparent electric conductive layer 15b is formed in the shape of a rectangle. The upper transparent electric conductive layer 15b is connected with the lower transparent electric conductive layer 15a through the contact hole 18c. The upper transparent electric conductive layer 15b may be formed using ITO, etc. In this embodiment, the upper transparent electric conductive layer 15b is simultaneously formed using ITO with the first detection electrode 11, the second detection electrode 12, and the connection wiring 17.

In the portion where the terminal region of the FPC 4 is connected with the pad "p", the lower transparent electric conductive layer 15a overlaps the upper transparent electric conductive layer 15b. The upper transparent electric conductive layer 15b is not oxidized easily compared with a metal layer. For this reason, a reliable pad "p" can be obtained.

Even if the metal layer 19 is formed with the above materials, such as aluminum, the pad "p" can be formed by contacting the upper transparent electric conductive layer 15b to the lower layer transparent electric conductive layer 15a, without contacting the upper transparent electric conductive layer 15b to the metal layer 19 directly. Therefore, the pad "p" which does not become the fault at the time of thermo compression bonding can be obtained.

As mentioned above, the metal layer 19 includes the aluminum layer in which its surface is oxidized very easily. Furthermore, the metal layer 19 also includes a bottom barrier metal layer which is hard to be oxidized. Since the bottom barrier metal layer covers the bottom of the aluminum layer, it becomes possible to achieve good ohmic contact between the metal layer 19 and the lower transparent electric conductive layer 15a.

In addition, when the barrier metal is not interposed between the aluminum layer (aluminum system metal layer) and the lower transparent electric conductive layer 15a (ITO), oxidization occurs on the surface of the aluminum layer. Therefore, ohmic contact is not achieved between the aluminum layer and the lower transparent electric conductive layer 15a.

As shown in FIG. 4, the alignment pattern M is located in the outside of the input area R1, and arranged on the shielding layer 7. The alignment pattern M is formed, for example, in the overlap area R3.

The alignment pattern M is formed with the metal pattern, the transparent electric conductive pattern, or their composite layers. When forming the alignment pattern M by the metal pattern, the alignment pattern M can be simultaneously formed with the same material as the metal layer 19. When forming the alignment pattern M by a transparent electric conductive pattern, the alignment pattern M can be a simultaneously formed with the same material as the upper transparent electric conductive layer 15b. When forming the alignment pattern M with the composite layers of the metal pattern and the transparent electric conductive pattern, the alignment pattern M can be simultaneously formed with the same material as the metal layer 19 and the upper transparent electric conductive layer 15b.

In this embodiment, the alignment pattern M is formed of the metal pattern. As mentioned above, in any cases, the alignment pattern M can be formed with the same material as the pad group PG.

As shown in FIG. 1, the FPC 4 includes a pad group which is not illustrated and a plurality of wirings connected to the pad group. The terminal portion (pad group) of the FPC 4 is arranged on the overlap area R3 in the insulating substrate 6.

Moreover, the FPC 4 includes an alignment pattern which is not illustrated. The alignment pattern M and the alignment pattern of the FPC 4 are used as a mark for alignment between the pad group PG and the pad group of the FPC 4.

The terminal portion of the FPC 4 is mechanically connected to the overlap area R3 in the insulating substrate 6. The pad group of the FPC 4 is electrically connected with the pad group PG. For example, the terminal portion of the FPC 4 is bonded to the overlap area R3 in the insulating substrate 6 by thermo-compression bonding through thermosetting electric conductive adhesion material which is not illustrated.

The first wiring W1 (the first detection electrode 11) and the second wiring W2 (the second detection electrode 12) are connected with external electronic components through the pad group PG and the FPC 4. The above-mentioned electronic components can acquire input position information (input position coordinate) by sensing change of the electrostatic capacitance in the first wiring W1 and the second wiring W2 through the FPC 4.

The adhesion material 5 is located between the liquid crystal display panel 1 (display surface S) and the touch panel 3. A transparent material is used also for the adhesion material 5. The adhesion material 5 attaches the touch panel 3 on the liquid crystal display panel 1. As the adhesion material 5, ultraviolet curing type or thermosetting type materials can be used.

In the touch panel 3 and the liquid crystal display device configured as mentioned above according to this embodiment, the touch panel 3 is equipped with the pad group PG. The pad "p" includes the lower transparent electric conductive layer 15*a*, the insulating layer 18*b* formed on the lower transparent electric conductive layer 15*a*, the contact hole 18*c* formed in the insulating layer 18*b* for exposing the lower transparent electric conductive layer 15*a*, and the upper transparent electric conductive layer 15*b* formed on the insulating layer 18*b* and connected with the lower transparent electric conductive layer 15*a* through the contact hole 18*c*.

The pad "p" further includes the metal layer 19 arranged on the lower transparent electric conductive layer 15*a* and covered with the insulating layer 18*b* so as to surround the contact hole 18*c*. The metal layer 19 includes the aluminum layer formed of materials containing aluminum and the bottom barrier metal layer interposed between the aluminum layer and the lower transparent electric conductive layer 15*a*.

The metal layer 19 is formed in a frame shape. The pad "p" can be formed by contacting the upper transparent electric conductive layer 15*b* to the lower transparent electric conductive layer 15*a*, without contacting the upper transparent electric conductive layer 15*b* to the metal layer 19 directly. The metal layer 19 is provided with the barrier metal layer (bottom barrier metal layer) only on its one side which contacts the lower transparent electric conductive layer 15*a*. Since a top barrier metal layer is not provided, a manufacturing cost can be reduced compared with the case where MAM and TAT are used for formation of the metal layer 19.

The pad "p" uses the lower transparent electric conductive layer 15*a*. Since the lower transparent electric conductive layer 15*a* is used as a seat material for the metal layer 19, it is possible to raise the adhesive strength of the metal layer 19. Furthermore, the pad "p" uses the upper transparent electric conductive layer 15*b*. Thereby, the reliable pad "p" can be obtained. As mentioned above, the touch panel 3 and the liquid crystal display device equipped with the touch panel 3 can be supplied, in which the ohmic contact is achieved between the electric conductive layers forming the pad "p".

While certain embodiments have been described, these embodiments have been presented by way of example only, and are not intended to limit the scope of the inventions. In practice, the structural and method elements can be modified without departing from the spirit of the invention. Various embodiments can be made by properly combining the structural and method elements disclosed in the embodiments. For example, some structural and method elements may be omitted from all the structural and method elements disclosed in the embodiments. Furthermore, the structural and method elements in different embodiments may properly be combined. The accompanying claims and their equivalents are intended to cover such forms or modifications as would fall with the scope of the inventions.

Figure 10:
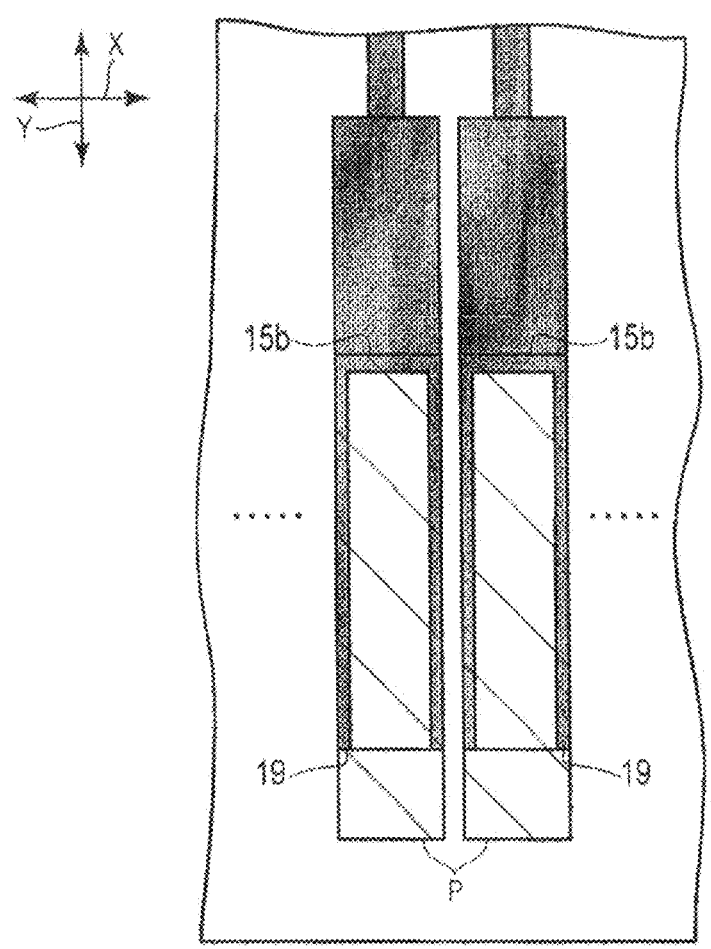
FIG. 10 is an enlarged plan view showing a modification of the pad in the touch panel.

For example, as shown in FIG. 10, the metal layer 19 may be formed in a U shape in which its lower end portion is opened without being surrounded, for example.

The embodiment of the present invention is applicable not only to the above-mentioned liquid crystal display device but various kinds of liquid crystal display devices. The electronic components according to the embodiment of the present invention are not limited to the touch panel, and can be modified variously. Furthermore, the electronic device according to the embodiment of the present invention is not limited to a liquid crystal display device either, and can be modified variously. The display panel according to the embodiment of the present invention is not limited to a liquid crystal display panel, and can be modified variously. For example, display panel may be an organic EL (electroluminescent) display panel.

What is claimed is:

1. An electronic component equipped with a pad, the pad comprising:
    a lower transparent electric conductive layer formed on an insulating substrate;
    an insulating layer formed on the lower transparent electric conductive layer;
    a contact hole formed in the insulating layer for exposing the lower transparent electric conductive layer;
    a metal layer formed on the lower transparent electric conductive layer and covered with the insulating layer so as to surround the contact hole; and
    an upper transparent electric conductive layer formed on the insulating layer and connected with the lower transparent electric conductive layer through the contact hole,
    wherein
    the metal layer is isolated from the upper transparent electric conductive layer by a gap and is formed on the lower transparent electric conductive layer,
    the upper transparent electric conductive layer includes an exposed surface for thermo compression bonding, and
    the metal layer overlaps two opposed peripheral edges of the exposed surface, and defines an outline of the exposed surface.

2. The electronic component equipped with a pad according to claim 1, wherein the metal layer includes an aluminum layer containing aluminum and a bottom barrier metal layer interposed between the aluminum layer and the lower transparent electric conductive layer.

3. The electronic component equipped with a pad according to claim 1, wherein the metal layer is formed in a rectangular frame.

4. The electronic component equipped with a pad according to claim 1, wherein the metal layer is formed in a U shape.

5. The electronic component equipped with a pad according to claim 2, wherein the aluminum layer is formed of aluminum system alloy metal.

6. The electronic component equipped with a pad according to claim 5, wherein the aluminum system alloy metal is formed of AL-Nd (aluminum neodymium system alloy).

7. The electronic component equipped with a pad according to claim 1, wherein the lower transparent electric conductive layer contacts the insulating layer.

8. The electronic component equipped with a pad according to claim 1, wherein a portion of the metal layer is not overlapped by the upper transparent electric conductive layer.

9. The electronic component equipped with a pad according to claim 1, further comprising an upper shielding layer on which the lower transparent electric conductive layer is formed.

10. The electronic component equipped with a pad according to claim 9, further comprising a lower shielding layer on which the upper shielding layer is formed.

11. The electronic component equipped with a pad according to claim 10, wherein the upper shielding layer contacts the upper transparent electric conductive layer and the insulating layer.

12. The electronic component equipped with a pad according to claim 1, wherein the exposed surface is overlapped with a flexible printed circuit.

13. The electronic component equipped with a pad according to claim 1, wherein a portion of the exposed surface which is overlapped by the metal layer directly contacts a wiring substrate.

14. A touch panel comprising:
an insulating substrate including an input area and a peripheral area located adjacent to the input area;
an input device arranged in the input area and including a plurality of detection electrodes arranged in first and second directions orthogonally crossing each other in a matrix shape;
a plurality of pads arranged in the peripheral area and connected with the detection electrodes through connection wirings,
wherein the pad including,
a lower transparent electric conductive layer formed on the insulating substrate,
an insulating layer formed on the lower transparent electric conductive layer,
a contact hole formed in the insulating layer for exposing the lower transparent electric conductive layer,
a metal layer formed on the lower transparent electric conductive layer and covered with the insulating layer so as to surround the contact hole, and
an upper transparent electric conductive layer formed on the insulating layer and connected with the lower transparent electric conductive layer through the contact hole,
wherein the metal layer is isolated from the upper transparent electric conductive layer by a gap and is formed on the lower transparent electric conductive layer,
the upper transparent electric conductive layer includes an exposed surface for thermo compression bonding, and
the metal layer overlaps two opposed peripheral edges of the exposed surface, and defines an outline of the exposed surface.

15. The touch panel according to claim 14, wherein the detection electrode is formed of the same material as the lower transparent electric conductive layer or the upper layer transparent electric conductive layer.

16. The touch panel according to claim 14, wherein the metal layer includes an aluminum layer containing aluminum and a bottom barrier metal layer interposed between the aluminum layer and the lower transparent electric conductive layer.

17. The touch panel equipped with a pad according to claim 16, wherein the aluminum layer is formed of aluminum system alloy metal.

18. The touch panel equipped with a pad according to claim 17, wherein the aluminum system alloy metal is formed of AL-Nd (aluminum neodymium system alloy).

19. The touch panel according to claim 14, wherein the pads of the touch panel are electrically connected with pads of a Flexible Printed Circuit Board (FPC) using adhesion material formed of an ultraviolet curing type or a thermosetting type materials.

20. The touch panel according to claim 14, wherein a portion of the exposed surface which is overlapped by the metal layer directly contacts a wiring substrate.

21. A liquid crystal display device comprising:
a touch panel including;
an insulating substrate including an input area and a peripheral area located adjacent to the input area,
an input device arranged in the input area and including a plurality of detection electrodes arranged in first and second directions orthogonally crossing each other in a matrix shape, and
a plurality of pads arranged in the peripheral area and connected with the detection electrodes through connection wirings,
wherein the pad includes,
a lower transparent electric conductive layer formed on the insulating substrate,
an insulating layer formed on the lower transparent electric conductive layer,
a contact hole formed in the insulating layer for exposing the lower transparent electric conductive layer,
a metal layer formed on the lower transparent electric conductive layer and covered with the insulating layer so as to surround the contact hole, and
an upper transparent electric conductive layer formed on the insulating layer and connected with the lower transparent electric conductive layer through the contact hole,
wherein
the metal layer is isolated from the upper transparent electric conductive layer by a gap and is formed on the lower transparent electric conductive layer,
a liquid crystal display panel including a display area arranged facing the input area,
the insulating substrate includes a light shielding layer in the peripheral region, and the pads are formed on the light shielding layer,
the upper transparent electric conductive layer includes an exposed surface for thermo compression bonding, and
the metal layer overlaps two opposed peripheral edges of the exposed surface, and defines an outline of the exposed surface.

22. The liquid crystal display device according to claim 21, wherein the metal layer includes an aluminum layer containing aluminum and a bottom barrier metal layer interposed between the aluminum layer and the lower transparent electric conductive layer.

23. The liquid crystal display device according to claim 22, wherein the aluminum layer is formed of aluminum system alloy metal.

24. The liquid crystal display device according to claim 21, wherein a portion of the exposed surface which is overlapped by the metal layer directly contacts a wiring substrate.

* * * * *